Feb. 12, 1952   M. M. GUGGENHEIM   2,585,765
CONFECTION ENROBER APPARATUS
Filed Aug. 26, 1949   3 Sheets-Sheet 1
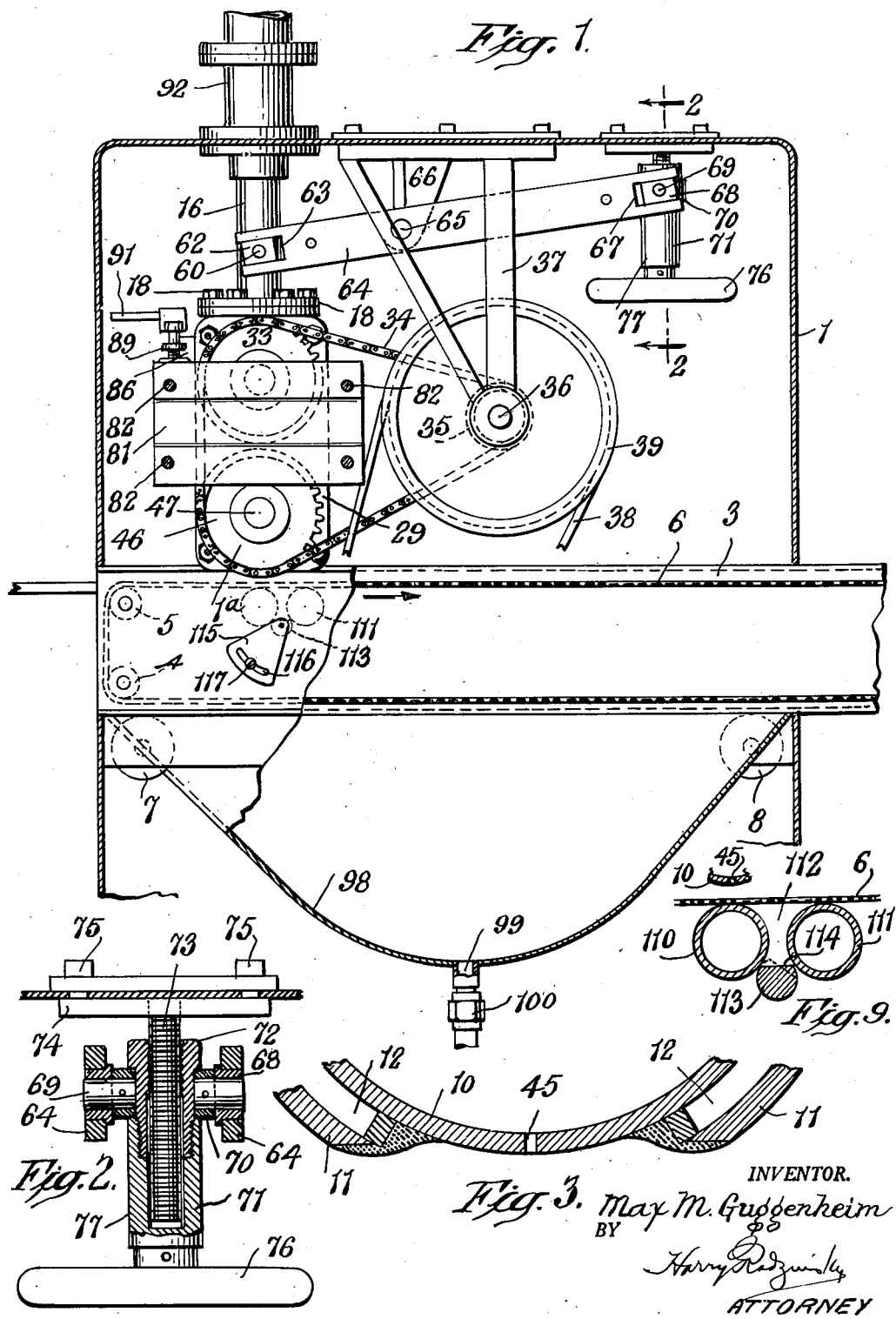
INVENTOR.
Max M. Guggenheim
BY
Harry Radzwisky
ATTORNEY

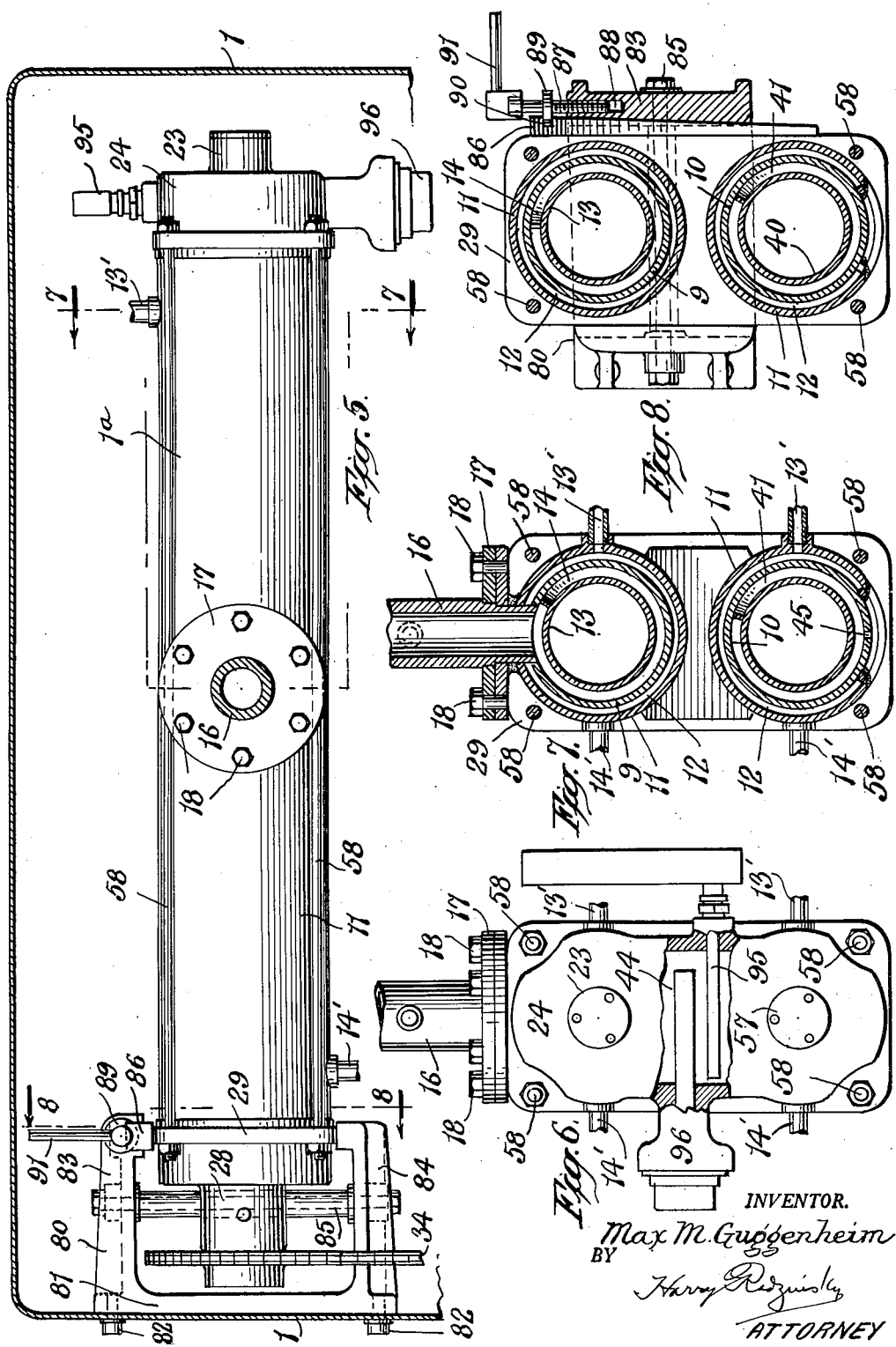

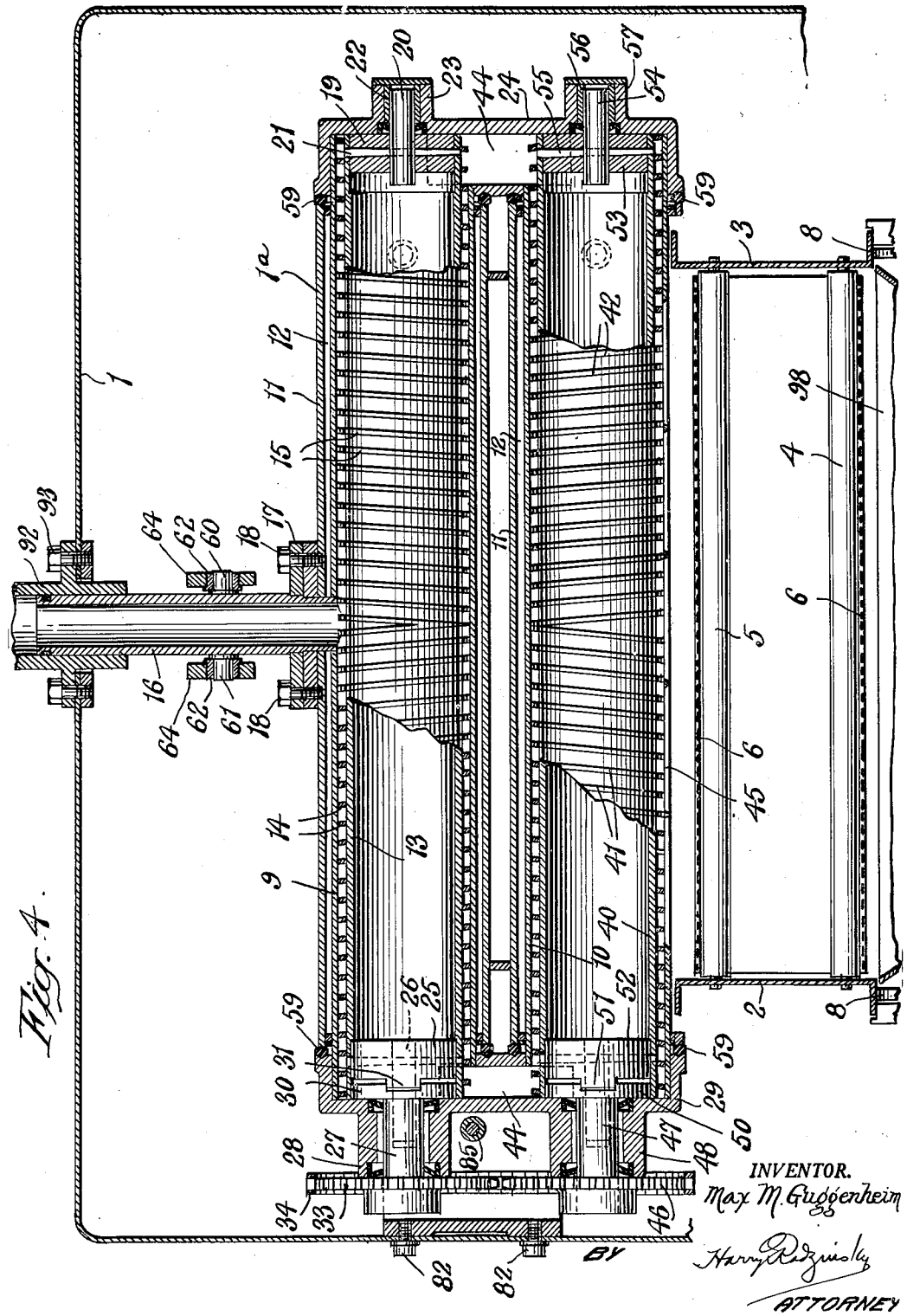

Patented Feb. 12, 1952

2,585,765

UNITED STATES PATENT OFFICE 2,585,765

CONFECTION ENROBER APPARATUS

Max M. Guggenheim, New York, N. Y., assignor to National Equipment Corporation, New York, N. Y., a corporation of New York Application August 26, 1949, Serial No. 112,495

2 Claims. (Cl. 118—20)

This invention relates to confectionery machines, and more particularly to that type of machine known as an enrober, and by means of which a coating of chocolate or other edible or non-edible material in fluid condition is applied to candies or confections.

An object of this invention is to provide a simplified and effective structure by means of which candies or other articles to be coated are carried on a wire-belt conveyor below a horizontally-disposed cylinder having at least one slot opening extending for substantially the width of the belt and from which the fluid, heated chocolate or other coating is fed in a continuous stream to descend upon and coat or enrobe the candies carried by the conveyor.

Another object of the invention is to provide, in a machine of this character, tempering means by which the chocolate, to be deposited as above described, is maintained in proper temperature and fluid condition, is smooth-flowing and is handled in a sanitary manner, with the excess recaptured and circulated for representation to the candies or other articles carried by the belt. Another object of the invention is to provide adjusting means for controlling and maintaining the temperature of the chocolate or other coating down to the point where said coating descends upon the object to be enrobed; for maintaining the coating material in proper fluidity and for adjusting the enrobing unit as a whole to and from the conveyor.

The invention further contemplates numerous structural features which result in simplicity of operation and in most effective coating of the candies or confections in a sanitary and practical manner.

These and other objects are attained by the invention, a more particular description of which will hereinafter appear and be set forth in the claims appended hereto.

In the accompanying drawings, wherein an illustrative embodiment of the invention is disclosed, Fig. 1 is a side view, with parts in section, of the elements of an enrober to which the present invention relates; Fig. 2 is a sectional view taken on the line 2—2 of Fig. 1, looking in the direction of the arrows; Fig. 3 is a sectional view taken through the bottom portion of the lower cylinder of the tempering and feeding unit; Fig. 4 is a vertical sectional view, with some parts fragmentarily shown, of the tempering and coating feeding unit; Fig. 5 is a top plan view of the tempering and feeding unit; Fig. 6 is a view looking at the right end of the unit shown in Fig. 5, with parts broken away to disclose construction; Fig. 7 is a sectional view taken on the line 7—7 of Fig. 5, looking in the direction of the arrows; Fig. 8 is a sectional view taken on the line 8—8 of Fig. 5, looking in the direction of the arrows; and Fig. 9 is a sectional view showing the rollers which cooperate in the enrobing operation.

Referring to the drawings, I indicates generally, the housing of the enrober, into which a conveyor frame, including channelled side bars 2 and 3, enters. Said bars 2 and 3 support rollers 4 and 5 around which a wire belt or conveyor 6 extends, the same supporting and carrying the candies to be coated or enrobed by the chocolate or other coating material descending from the feeding and tempering unit situated above the wire belt, and to be presently described. The belt is moved by suitable mechanism, known in this art, and to facilitate the cleansing of the belt, the belt and the frame which carries it, and including the side bars 2 and 3, is slidable out of the housing I by movement along the supporting rollers 7 and 8 mounted in the housing I as clearly seen in Fig. 1.

Located below the upper stretch of the chain conveyor and below the means from which the coating material descends, is a pair of rollers, indicated respectively at 110 and 111. These rollers are rotated by suitable driving means and are in spaced relation to provide a chamber 112 between them. At the bottom of said chamber is located a stationary rod 113 formed with a flat surface 114 that is slightly spaced from the rollers, said spacing being adjustable as indicated in dotted lines in Fig. 9 to allow a predetermined outflow of the coating material from the chamber 112 between the rollers 110 and 111. These rollers and the chamber 112 produced between them, serve to coat the under or lower surfaces of the candies supported on the upper stretch of the chain conveyor as will be later explained. The rod 113 carries a quadrant 115 at one end provided with a slot 116 receiving a screw 117 for maintaining the rod 113 in any selected position.

The tempering and feeding unit 1a for the coating material, which might be chocolate, icing or other edible or non-edible coating, includes a pair of superimposed, parallel, horizontally-extending tubes or cylinders shown respectively at 9 and 10. The upper cylinder 9 includes an outer jacket 11 spaced from the cylinder body 9 to provide an annular chamber 12 for containing a fluid of the proper temperature to maintain the chocolate or other coating constantly at the required temperature and in proper fluidity during operation of the machine. Heated or cool water, steam or other fluid at the proper controlled temperature is circulated through the chamber 12, access thereto being had by means of the pipe 13'. Outlet from the heating chamber is had by means of an outlet pipe indicated at 14'.

Rotatively mounted within the upper cylinder 9 is a feeding member or worm 13 of tubular form, provided with spirally-arranged continuous fins 14 and 15, the arrangement and disposition of these spiral fins being such that the chocolate or other coating material forced under pressure into the cylinder 9 through the inlet pipe 16 located at the top of the cylinder at substantially a central point on the cylinder, will be forced by said fins from the central part of the cylinder toward its opposite ends. The inlet pipe 16 is provided with a flange 17 by which it is attached to the cylinder by the screws 18 as clearly shown in Fig. 4.

At one end, the rotative feeder or worm 13, constituting a distributor, is closed by a plug 19 to which is attached a stud shaft 20 by means of the taper pin 21. The stud shaft 20 is rotatively supported in a bearing 22 provided in a boss 23 formed on the end plate 24 of the tempering and feeding unit. At its opposite end, the feeder or distributor 13 is closed by a plug 25 which carries a stud shaft 26 received in a rotated shaft 27 rotatively mounted in the boss 28 provided on an end plate 29. A driving connection between the shaft 27 and the rotative feeder 13 is established by means of a recessed disk 30 on the end of the shaft 27 engaging with a dog or tooth 31 provided on the plug 25.

Secured on the shaft 27 is a sprocket 33 which receives a chain 34, extending about a sprocket 35 on a shaft 36 rotatively supported in a bracket 37, attached to and dependent from the top of the housing 1. Said shaft 36 is driven from a suitable power source, such as an electric motor, by the belt 38 extending about a pulley 39 mounted on the shaft 36 as clearly shown in Fig. 1.

The lower cylinder 10 is similar in most respects to the upper cylinder 9, the same being provided with a jacket 11 to provide the chamber 12 for the temperature-controlling fluid as pointed out with respect to the upper cylinder. The distributor or worm 40 contained in the lower cylinder 10 is provided with the continuous spiral fins 41 and 42 corresponding to those found on the upper feeder, excepting that the same are arranged oppositely thereto. That is to say, when the upper feeder 9 is rotated the fins 14 and 15 thereon will tend to direct the fluid coating material toward the opposite ends of the upper cylinder, while the fins 41 and 42 on the lower cylinder are so arranged that the same direct the coating material from the ends of the lower cylinder toward the center of the same.

It will be noted that at each end of the cylinders there is located a communicating passage 44 between the two cylinders. The coating material directed toward the ends of the upper cylinder, is forced down through these passages 44 to reach the lower feeder 40 which directs it toward the center of the lower cylinder and forces it out of one or more slots 45 in the lower portion of the lower cylinder 10 to descend and flow over and around, and coat or enrobe, the candies supported on the wire belt 6 and carried below the slot 45.

The lower feeder or worm 40 may be driven at the same speed as the upper feeder or worm, or the speed of the two worms may be different and they may be operated by a variable speed drive. The worms are driven by means of the chain 34 which extends around the sprocket 46 on shaft 47 rotative in the boss 48 on the end member 29. Shaft 47 carries at one end a recessed disk 50 which engages with the tooth or dog 51 on the disk 52 in the end of the feeder or worm 40. At its opposite end, the feeder or worm 40 is closed by the plug 53, similar to that in the upper cylinder and shown at 19. A stud shaft 54 is secured in the plug 53 by means of the taper pin 55, and said stud shaft is rotative in the bearing 56 located in the boss 57 on the end plate 24.

The end plates 24 and 29 clampingly retain the two cylinders 9 and 10 between them by means of the lengthy threaded rods or bolts 58, with suitable packings or gaskets 59 interposed between the ends of the jackets 11 and the end plates to prevent fluid leakage at these points.

The feeding and tempering unit as above described, is adjustable vertically above the wire belt, and for this purpose, the inlet pipe 16 is provided with diametrically opposite pins 60 and 61, each of which carries a block 62 mounted in the clevissed and slotted end 63 of a lever 64, which is pivoted at 65 in a bracket 66 secured to and dependent from the top of the housing 1 as clearly seen in Fig. 1. Said lever 64 is slotted at its opposite end, as shown at 67 to engage the blocks 68 rotatively mounted on the pins 69 extending from a collar 70 surrounding an adjusting member 71. Said adjusting member comprises an internally threaded sleeve 72, whose internal threads engage with those on the threaded fixed stud 73 fastened to and extending downwardly from a plate 74 attached to the top portion of the housing 1 by the screws 75. The operating handle includes the hand-wheel 76 fastened to a hub 77 secured to the sleeve 72, the result being that when the hand-wheel is rotated, the sleeve 72 will be raised or lowered along the stud 73, and since the collar 70 is maintained by the sleeve 72 and the hub 71 attached thereto, the collar 70 will be raised or lowered accordingly. This results in pivotal movement of the lever 64, to raise or lower the feeding and tempering unit and position it at the desired height above the wire belt 6.

To support the tempering and feeding unit at its driven end, a bracket shown at 80 is provided. The same includes an end web 81 attached to the side wall of the housing 1 by screws 82 as shown in Figs. 4 and 5. Said bracket is formed with side arms 83 and 84 stiffened and braced by the cross rod 85, and said side arms 83 and 84, embrace the edges of the end plate 29 between them. A wedging device for locking the unit in any desired position is seen in Fig. 8 wherein it will be noted that the same consists of the wedge member 86 located between the arm 83 of the bracket 80 and the edge of the plate 29, said wedge being capable of raising or lowering movement by means of the threaded adjusting pin 87, threadably received in the internally threaded aperture 88 provided in the top of the arm 83. The pin 87 carries a disk 89 operative in a slot 90 provided in the wedge 86, and rotative movement of the pin 87 is effected by means of the handle 91 provided on said pin. This arrangement is such that by rotative movement of the pin 87, the same will be raised or lowered and the disk 89 thereon will cause raising or lowering movement of the wedge 86 as required to either free the unit for adjustment or else when the wedge is driven home, to securely lock the unit against shifting movement.

It will be noted that the upper end of the feed pipe 16 is slidable through a sleeve 92, fastened by screws 93 to the top of the housing 1. This slidable connection between the pipe 16 and sleeve 92 permits the vertical adjustment of the tempering and feeding unit in the manner heretofore described. The sleeve 92 is coupled through suitable piping to a tank or vat containing the chocolate or other coating and from which the chocolate or other coating is pumped to reach the pipe 16 and be forced under pressure therethrough to reach the tempering and feeding unit for dispensation therefrom to the candies moved on wire belt 6 beneath it.

The maintenance of the chocolate or other coating in a suitable condition by being maintained at the proper and somewhat critical temperature, and with said temperature maintained, is facilitated by a suitable thermostatic control 95 located in one of the connecting passages 44, and a thermostatic meter 96 may also be located in the same chamber to facilitate a reading of the temperature of the chocolate or other coating.

An important feature of the maintenance of control of the temperature of the coating within the cylinders 10 and 40 is the fact that the temperature of this material is maintained to almost the very point where the coating descends onto the candies or other articles to be enrobed.

It will be noted from Fig. 3 that the jacket 11 on the lower cylinder 10 does not completely enclose said cylinder but is omitted at the lower portion of the cylinder to expose the slot 45.

From the foregoing, the operation of the apparatus will be apparent. The heated and fluid chocolate or other coating material enters the tempering and feeding unit 1a by being forced by a pump from a suitable tank or vat to the pipe 16. The chocolate or coating entering the pipe 16 under pressure will then be forced into the upper cylinder 9 and by action of the rotative feeder or worm 13 therein will be moved toward the opposite ends of the cylinder to enter the passages 44 and reach the ends of the lower cylinder 10. The action of the worm or feeder 40 in said lower cylinder is such as to force the chocolate or other coating in a direction toward the center of the cylinder thus distributing the same for the length of the cylinder and forcing the same down and out through the slot 45. The temperature of the coating is maintained to this point. Several spaced slots of this character may be provided in the lower cylinder so that one or more "curtains" of descending chocolate or other coating may be caused to descend down upon the candies or confections carried by the wire-belt conveyor below such slots, thus enrobing or coating the candies.

As the coating material, which might be chocolate, descends from the slot 45 onto the objects to be enrobed, it falls onto the roller 110 below the slot and beneath the upper stretch of the wire-belt conveyor. The coating material is carried by rotative movement of the roller 110 into chamber 112 formed between the rollers 110 and 111 and the rod 113. The spacing of rod 113 from the rollers permits the outflow of the coating from chamber 112 to a predetermined extent, maintaining sufficient of the coating in the chamber to insure undercoating of the candies above it on the conveyor. The excess chocolate or other coating flowing downwardly between the wires of the belt conveyor will fall into a catch-pan 98 supported below the conveyor. An outlet 99 leads from the catch-pan and is connected by suitable piping 100 to pump mechanism which conveys the chocolate back to the tank or vat from which it was initially delivered into the pipe 16. The chocolate or other coating is thus circulated in a manner to capture and permit the re-use of this unused material.

The action of the tempering and feeding unit is such as to maintain the chocolate or other coating in a smooth, free-flowing condition and at the proper temperature to insure proper coating or enrobing action, and good-quality chocolate. The belt conveyor may be removed from below the unit when desired for cleansing and the apparatus is such as to effectively, speedily and uniformly coat the candies and insure uniform goods.

By the structure disclosed, the amount of material caused to flow out of the slot 45 is reduced to a minimum required for complete enrobing of the candies or other objects to be coated. This enables a very effective control of the temperature of the material to be had because of the handling of the relatively small amount of the coating material passing through the cylinders 13 and 41 and out of slot 45.

While I have herein shown only a single enrobing unit, it will be apparent that a number of these units can be employed, and the cylinders or tubes in each unit might also be increased in number if such an arrangement is found desirable.

Having described one embodiment of the invention, it is obvious that the same is not to be restricted thereto, but is broad enough to cover all structures coming within the scope of the annexed claims.

What I claim is:

1. In an enrober, a movable, perforate conveyor, a tempering unit mounted above the conveyor and being provided with at least one slot-like outlet from which a curtain of coating material descends to fall upon objects carried by the conveyor below the slot-like outlet, a pair of spaced rollers below the conveyor and below the slot, a closure member in the form of a rod located between and below the rollers, said rod having a flat upper face, and means for rotatively adjusting said rod to regulate the angular position of the flat face thereof relatively to the rollers to thereby control the outflow of coating material from the space between the rollers.

2. In an enrober, a movable, perforate conveyor, an enrobing unit located above the conveyor, said enrobing unit consisting of a pair of cylinders arranged one above the other with their axes disposed horizontally, an inlet pipe to the upper cylinder at substantially the center thereof, outlet passages at the ends of said cylinder in communication with the ends of the lower cylinder, a fluid chamber around each cylinder for controlling the temperature of coating material therein, means in the upper cylinder for feeding fluid coating material from the ends of said cylinder toward the center, the lower cylinder having a lengthy outlet slot on its lower portion for emission of a curtain of coating material on articles carried on the conveyor, spaced rollers below the conveyor forming a coating-receiving chamber between them, a rod below and between the rollers for partly closing the bottom of said chamber, said rod being rotatively adjustable and having a flat upper face angularly adjustable in respect to the rollers by rotative adjustment of the rod.

MAX M. GUGGENHEIM.

REFERENCES CITED

The following references are of record in the file of this patent:

UNITED STATES PATENTS

| Number | Name | Date |
| --- | --- | --- |
| 1,323,948 | Bausman | Dec. 2, 1919 |
| 1,932,158 | Grieve | Oct. 24, 1933 |
| 2,175,054 | Ferngren et al. | Oct. 3, 1939 |
| 2,437,460 | Francisci | Mar. 9, 1948 |